May 13, 1924.  
J. B. MOYER  
COTTER PIN EXTRACTOR  
Filed June 23, 1921  
1,493,821

Inventor  
John B. Moyer.  
By  
Attorney

Patented May 13, 1924.

1,493,821

UNITED STATES PATENT OFFICE.

JOHN B. MOYER, OF LUCAS, SOUTH DAKOTA.

COTTER-PIN EXTRACTOR.

Application filed June 23, 1921. Serial No. 479,906.

*To all whom it may concern:*

Be it known that I, JOHN B. MOYER, a citizen of the United States, residing at Lucas, in the county of Gregory and State of South Dakota, have invented new and useful Improvements in Cotter-Pin Extractors, of which the following is a specification.

This invention relates to tools for removing cotter pins and like devices used for securing nuts on bolts, and its object is to provide a very simple and highly efficient tool of this kind, and also one which is easy to operate.

The object stated is attained by means of a novel combination and arrangement of parts to be hereinafter described and claimed, and in order that the same may be better understood, reference is had to the accompanying drawing forming a part of this specification.

Figure 1:
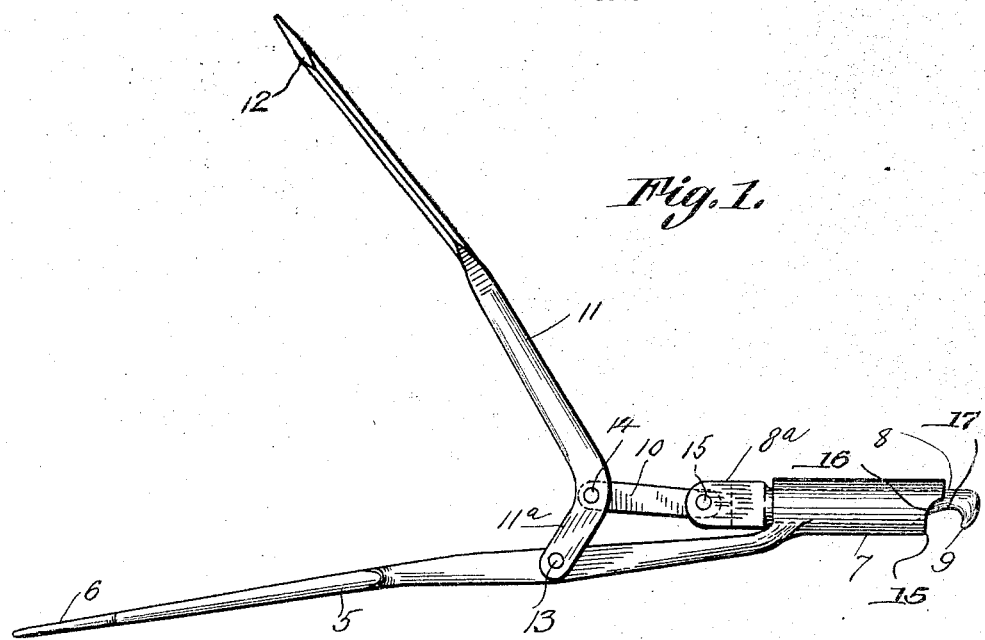
Figure 1 is a side elevation of the tool.
Figure 2:
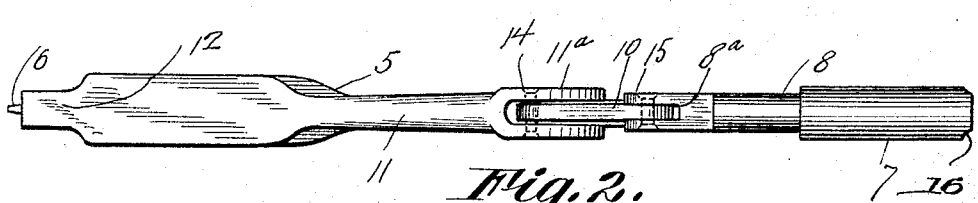
Fig. 2 is a top plan view thereof, showing the same closed to retract the cotter pin engaging part.
Figure 3:
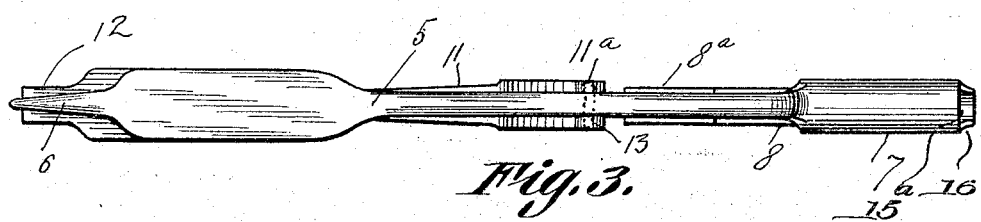
Fig. 3 is an inverted plan view.

Referring specifically to the drawing, 5 denotes an elongated handle member having its rear end pointed, as shown at 6, so that this end may be used for cleaning out the cotter pin hole of a bolt. The forward end of the member 5 is formed with a guide tube 7 in which is slidably mounted a shank 8 having its outer end formed with a hook 9. The rear end of the shank 8 is connected by a link 10 to a lever handle 11 pivoted to the member 5 back of the guide tube 7. The outer end of the lever 11 is flattened and fashioned into a blade 12 having an endwise taper so that it may be used for spreading the ends of a cotter pin.

That end of the lever 11 which is connected to the member 5, is forked as shown at 11$^a$, to straddle the same, and the pivot pin 13 passes therethrough. The rear end of the link 10 seats between the fork branches and the pivot pin 14 connecting the link to the lever passes therethrough. The rear end of the shank 8 to which the forward end of the link 10 is connected, is also forked as shown at 8$^a$, with the pivot pin 15 whereby the connection is made passing through the fork branches.

In operation, the lever 11 is swung outwardly to advance the hook 9, and upon inserting the hook into the eye of the cotter pin and then swinging the lever toward the handle member 5, the hook is retracted and the cotter pin is withdrawn from the bolt in an obvious manner. The operator can grip the member 5 with one hand and use the other hand for operating the lever 11. The operating means of the hook are designed to give the hook a stroke of sufficient length to withdraw with a single stroke of the lever 11 the largest sized cotter pins used on motor vehicle parts, the tool being designed more particularly for, although not limited to, that class of work.

The handle 5 as will be noted is substantially plane which permits the device to be layed on a flat surface and manipulated with both hands while the feet rest upon the handle. The double pivotal connection between the bifurcated end 8$^a$ of the hook shank 8 and the lever 11 through the medium of the link 10 and pins 14 and 15 serves to give the lever a long path of movement which will draw the hook 9 a sufficient distance to remove cotter pins of the largest sizes. Another important feature of the structure just recited is that it permits the attachment of the lever 11 to the handle member 5 at a point adjacent the tubular guide 7 thus increasing the leverage and reducing the amount of muscular power necessary for manipulation of the lever, without, however, tending to cause a binding of the shank 8 in the guide as would be the case in the absence of the link with its double pivotal connection between the lever and shank.

The forward end of the guide tube 7 is provided with a recess 15$^a$ which is located at the same side of the guide tube as the side thereof with which the handle member 5 joins thereto. The said recess is comparatively broad in that it extends approximately half way around the guide tube and the said recess is provided with curved end walls or edges 16. The shank 8 is in the form of a bolt and the hook 9 is formed by providing a recess 17 in the side of the said shank. The recess 17 is disposed toward the recess 15$^a$. Therefore when the bill end of the hook 9 is moved into the recess 15$^a$ the upper portion of the end of the tubular guide will extend over the upper extremity of the hook and the inner portion of the recess 17 is moved into the guide. When the head of a cotter pin is inserted in the recesses 15ª and 17 and the hook 9 is moved into the eye of the head of the pin the outer surface of the top of the head of the pin is drawn in close contact with the inner wall surface of the recess 17 and in close contact with the edges of the curved walls 16 of the recess 15ª. The inner wall edge of the recess 15ª bears against the side of the head of the cotter pin and thus the cotter pin is positively and securely held in the extractor.

I claim:

A cotter pin extractor comprising a tubular guide member provided at the edge of its forward end with a recess having curved end walls, a shank slidably mounted in the guide and being provided at the side of its forward end portion with a recess whereby a hook is formed at the forward end of the shank, the bill end of the hook lying within the circumference of the guide member and adapted to enter the recess in the guide member, the said recess being of greater breadth than the transverse breadth of the hook whereby the end walls of the recess are spaced from the sides of the hook when the hook is in the recess, a handle member joined with the guide member at the same side thereof as that at which the recess is located and at the opposite end of the guide member, a lever fulcrumed upon the handle member and means operatively connecting the lever with the inner end of the shank.

In testimony whereof I affix my signature.

JOHN B. MOYER.